Jan. 22, 1924.  
T. L. CARBONE  
CHANGE SPEED GEAR  
Filed Dec. 23, 1919

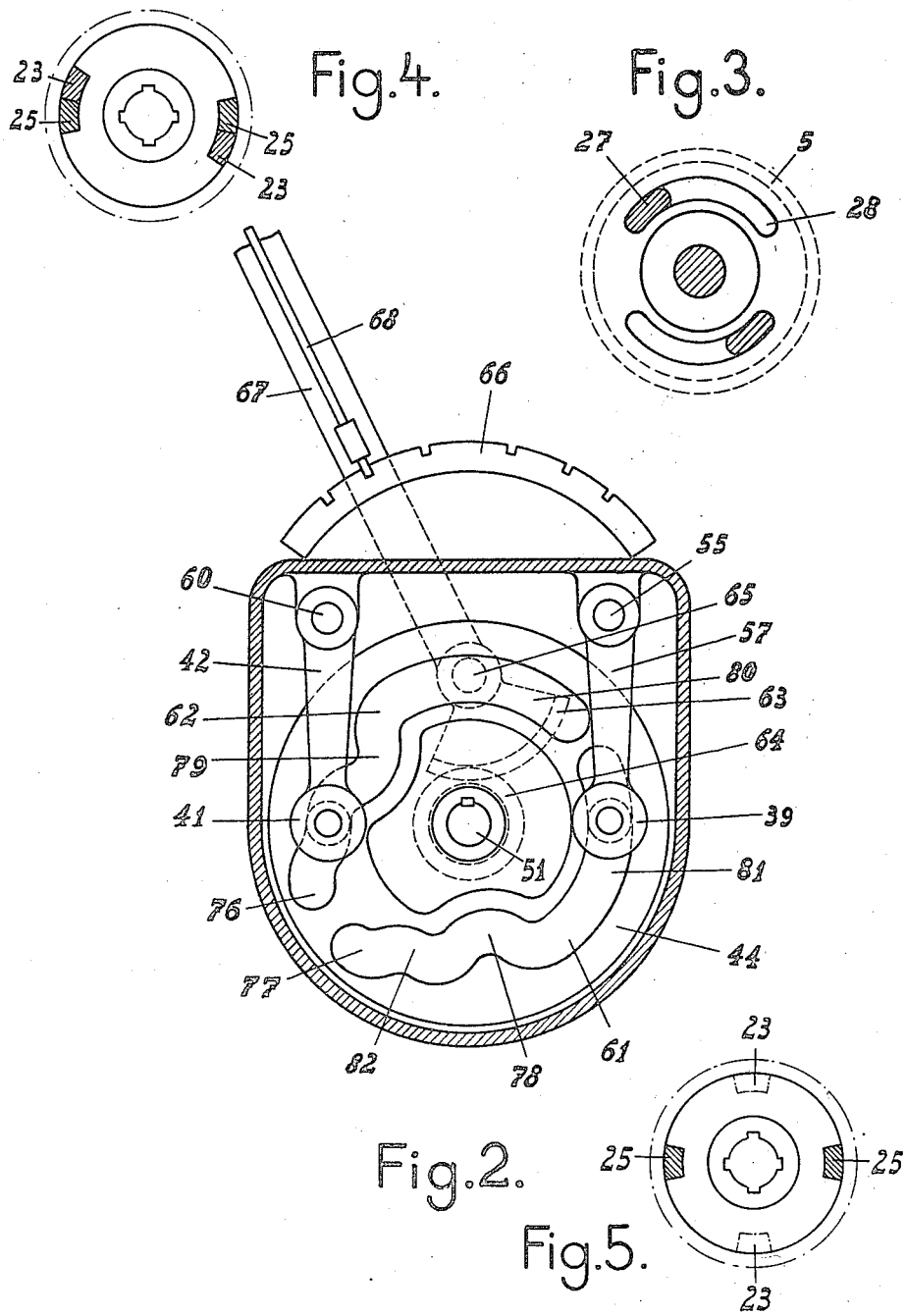

Patented Jan. 22, 1924.

1,481,687

UNITED STATES PATENT OFFICE.

TITO L. CARBONE, OF ZURICH, SWITZERLAND.

CHANGE-SPEED GEAR.

Application filed December 23, 1919. Serial No. 346,908.

*To all whom it may concern:*

Be it known that I, TITO LIVIO CARBONE, residing at Lowenstrasse 1, Zurich, in the Canton of Zurich, Switzerland, have invented certain new and useful Improvements in Change-Speed Gears, of which the following is a specification.

The invention has reference to a change speed gear for automobiles and it consists in certain improvements, which are fully set forth in the following specification and shown in the accompanying drawings which form a part thereof.

The object of my invention is to provide a change speed gear suitable for motor cars and machines of any kind in which the load is liable to vary which change gear shall be positive in action, durable in use and eliminate objectionable lost motion by changing from one speed to another.

According to the invention I provide means which allow the changing of the speed by shifting a lever in but one direction step by step according to the speed desired.

My invention further consists of many details of construction, which, together with the features first mentioned will be better understood by reference to the drawings in which—

Fig. 2 shows a steering disk in front elevation;
Fig. 3 illustrates a gear with parts of a clutch member in section;

Figs. 4 and 5 show two co-acting gears in different positions.

Figure 1:
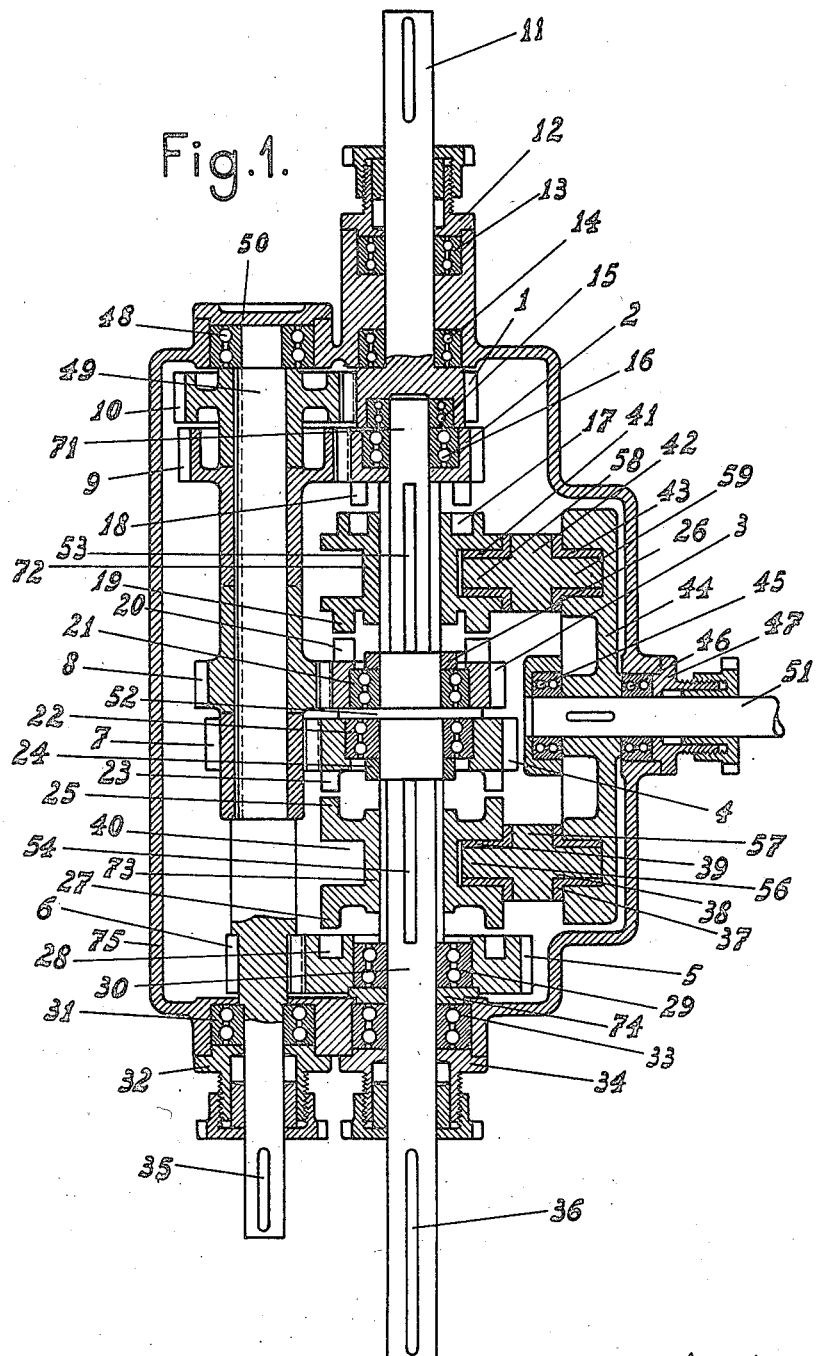
Fig. 1 is a sectional elevation of a change speed-gear embodying my invention.

The driving shaft of the motor is connected to the shaft 11 which shaft running in ball bearings 13, 14 carries a spur gear 1. In a recess of said gear 1 a ball bearing 15 is arranged in which a shaft 71 is journalled. The shafts 11 and 71 turn independently of each other. On the shaft 71 is loosely mounted a spur gear 2 by means of a ball bearing 16. On one of the faces of the spur gear 2 teeth 18 are provided adapted to engage recesses of a sleeve 72. The sleeve 72 is slidably mounted on the shaft 71 which shaft 71 by means of keys 53 rotates the sleeve 72. The sleeve 72 is provided with teeth 19 which cooperate with teeth 20 of a spur gear 3 loosely mounted on the shaft 71.
The gear 3 is journalled by means of a ball bearing 21. To prevent a displacement of the gear 3 in its axial direction a collar 26 is fixed on to the shaft 71 on one side of the gear and on the other side thereof a shoulder 52 is arranged. Aside the shoulder 52 another spur gear 4 is loosely mounted on the shaft 71 by means of a ball bearing 22, a collar 24 fixed to said shaft 71 prevents the axial displacement of the spur gear 4. The gear 4 is provided with teeth 23 projecting in axial direction and co-operating with similarly disposed teeth 25 of a sleeve 73. Sleeve 73 is slidably mounted on the shaft 71 and is rotated thereby by means of keys 54 fixed to said shaft. The sleeve 73 is further provided with teeth 27 adapted to engage recesses 28 of a spur gear 5 loosely mounted on the shaft 71 by means of a ball bearing 29. The gears are enclosed in a casing 75 in which the shafts 11 and 71 are journalled, the latter passes through a ball bearing 33 arranged in the casing 75. Between the bearings 29, 33 there is a disk 74 serving as an abutment for the said bearing 29. To prevent the exit of oil, or grease I provide stuffing boxes 12 and 34 for the shafts 11 and 30. The free end 36 of the shaft 71 projecting from the casing 75 is connected with the cardan shaft (not shown in the drawings). In the casing 75 another shaft 49 is journalled by means of ball bearings 48 and 31. One end of the shaft 49 is covered by means of a lid 50 screwed into the casing 75, the other end 35 of said shaft 49 passes through a stuffing box 32 of the wall of the casing 75. Rigidly fixed to or forming part of the shaft 49 are spur wheels 6, 7, 8, 9 and 10 meshing with gears 5, 4, 3, 2 and 1 respectively. In annular grooves of the sleeves 72, 73 rollers 41, 39 project which are rotatably mounted on bolts 58, 56 on levers 57 and 42 respectively. The levers 42, 57 are pivoted at 60 and 55 respectively within the casing 75 and are further provided each with a roller 43 and 37 respectively running on pivots 59 and 38. The rollers 37 and 43 engage curved grooves 61 and 62 respectively arranged in a cam disk 44 rigidly mounted on a shaft 51. The shaft 51 is rotatably mounted in the casing 75 by means of ball bearings 45, 46 and projects through a stuffing box 47 in the casing 75. The parts of the grooves 61, 62 are at different distances from the axis of rotation of the disk 44. By rotating the latter the levers 42, 57 are swung out and the sleeves 72, 73 are moved on the shafts 71. In the position of disk 44 shown in Fig. 2 the sleeves 72, 73 are in the position shown in Fig. 1 in which they are out of engagement with all the gears on shaft 71. The sleeves 72, 73 are brought out of the position shown in the drawings by rotating disk 44, each sleeve 72, 73 takes its most outward position if the corresponding roller 43 or 37 is in the position denoted by 76 and 77 respectively of the grooves 61, 62; and the sleeves take their innermost position if the rollers 43, 37 are in the position 78, 79 respectively. If the rollers are in the parts 80, 81 or 82 of the grooves 61, 62 the sleeves are positioned as shown in Fig. 1.

Each curved groove 61 and 62 operates two gears. Curved groove 61 engages gear 4 or 5 and curved groove 62 engages gear 2 or 3. This arrangement makes it possible to engage one gear and disengage the other one by the same groove. At the same time, by shifting one groove forward, one clutch keeps its center position, while the other one is operated by the other groove.

On the shaft 51 a spur wheel 64 is keyed with which a toothed segment 63 meshes. The segment 63 is pivoted at 65 and is rigidly fixed to a lever 67. On said rods 67 a rod 68 is provided the free end of which engages a notch of a notched segment 66. By rotating the segment 63 the disk 44 is simultaneously rotated shifting the sleeves 72, 73 in the predescribed manner. The segment 63 and therewith the disk 44 may be secured in any position by the rod 68 in the well known manner.

The shapes of the engaging teeth 27 of the sleeves 73 and of the recesses 28 of the gear 5 is shown in Fig. 3. The recesses 28 adapted to receive the teeth 27 are somewhat longer than the teeth 27 thus enabling an easy engagement of the parts.

The free end 35 may be used to connect a return drive with the change speed gear by means of which the shafts 30, 71 may be driven backwards.

The change speed gear works as follows:

The motor drives on the shaft 49 by means of the gears 1 and 10. A variable speed is transmitted to the shaft 71 by rotating disk 44 by means of lever 67 shifting thereby the sleeves 72, 73 and coupling any of the gears 2, 3, 4, or 5 with the shaft 71. To have the drive over the gears 3 and 8 the sleeve 73 is brought in engagement with the gear 3 and rotation is transmitted from the shaft 11 over the gears 1, 10, 8 and 3 to the shaft 71. If however the wheels 2, 9 are to be used for transmitting movement, the lever 67 is to be set in such a manner that the roller 43 is in the position 76 of groove 62 in which position, the sleeve 72 is in engagement with gear 2. Are the gears 5, 6 to be used it is necessary to set the lever 67 suchwise that roller 37 is at 77 of the groove 61 in which case the teeth 27 of sleeve 73 engage the recesses 28 of gear 5.

By turning the lever 67 from one of its end positions to the other all the different pairs of change speed gears may be brought to action and the change from one speed to another one is very easily effected as the teeth of one of the parts find the recesses of the co-acting part very easily the recesses being larger than the teeth. A disconnection of the motor from the shaft 11 is not necessary. As the different gears are always in mesh with each other undue strain on any of the gears is obviated by bringing any pair of gears into action. To shift from one speed to another the lever 67 makes a progressive motion in one direction to uncouple the driving shaft from the driven shaft no backward or return motion is to be given to the lever 67. If the lever 67 is in its initial position the first speed gear is acting, if lever 67 is moved and the shaft turned for 90° the teeth take a position that the second speed is thrown into gear, if lever 67 is again moved and the shaft rotated for another 90° the third speed is brought into action and by a still further rotation for 90° the fourth speed is working. By shifting the lever 67 and turning the shaft for 270° four different sets of speed transmitting gears are brought successively into action, lever 67 moving step by step in but one direction. The bringing of the coupling element in engagement with each other is greatly facilitated by giving the teeth great play in the slots of the pieces to be driven.

From the above it will be seen that by a continuous movement of one lever the different speeds are thrown in and out of gear.

While I have described my invention as adapted as a change speed gear for motor cars it may be employed for electrical cars and for any other machine or purpose for which it may be found adapted. While I have described what I believe to be the best mode of carrying my invention into commerical use, I do not confine myself to the details, as they may be modified without departing from the spirit of the invention.

Having now described my invention what I claim as new and desire to secure by Letters Patent, is—

In a change speed gear, a pair of coaxially mounted shafts one having a fixed gear and the other having a plurality of loose gears of various diameters, a third shaft mounted parallel with the pair of shafts and having a fixed gear engaged with the first named fixed gear, and fixed gears of various diameters respectively engaged with the first named loose gears, clutch elements slidably mounted each between a pair of the first named loose gears and on the same shaft therewith and for rotation by said shaft, a cam arranged for partial rotation and having cam grooves, tappet members engaging said cam grooves, tappet members respectively engaged to said clutch elements, pivotally mounted members arranged between the cam and the clutch elements and on which said tappet members are mounted, and means to operate said cam, the cam grooves of the cam being so constructed and aranged as to enable the clutches to be progressively shifted whereby one groove engages and disengages two gears.

In testimony whereof I affix my signature.

ING. TITO L. CARBONE.